US012433203B2

(12) United States Patent
Singer et al.

(10) Patent No.: US 12,433,203 B2
(45) Date of Patent: Oct. 7, 2025

(54) PLANT-SAFE ELECTROSPRAY WATER AND NUTRIENT DELIVERY SYSTEM

(71) Applicant: Rutgers, The State University of New Jersey, New Brunswick, NJ (US)

(72) Inventors: Jonathan Singer, New Brunswick, NJ (US); Seyyed Rahman Pejman, New Brunswick, NJ (US); Arend-Jan Both, New Brunswick, NJ (US); David Specca, New Brunswick, NJ (US); Michael J. Grzenda, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 18/236,765

(22) Filed: Aug. 22, 2023

(65) Prior Publication Data
US 2024/0057536 A1 Feb. 22, 2024

Related U.S. Application Data

(60) Provisional application No. 63/399,822, filed on Aug. 22, 2022.

(51) Int. Cl.
*A01G 7/04* (2006.01)
*B05B 5/16* (2006.01)

(52) U.S. Cl.
CPC .............. *A01G 7/04* (2013.01); *B05B 5/1608* (2013.01)

(58) Field of Classification Search
CPC ............................ B05B 5/1608; B05B 5/0535
See application file for complete search history.

(56) References Cited

U.S. PATENT DOCUMENTS 4,678,554 A * 7/1987 Oppitz .................... E02D 3/106 204/290.11
5,464,456 A * 11/1995 Kertz ...................... A47G 7/02 47/60
2007/0113472 A1* 5/2007 Plowman .............. A01G 31/02 47/62 A
2009/0293357 A1* 12/2009 Vickers ................. A01G 31/02 47/62 A (Continued)

FOREIGN PATENT DOCUMENTS

AT 410158 B * 1/2003 ............... A01G 7/04
CN 104969786 A * 10/2015 .............. A01G 7/04

(Continued)

OTHER PUBLICATIONS

Merged translation of SE_437210 (Year: 1985).*
(Continued)

*Primary Examiner* — Morgan T Jordan
(74) *Attorney, Agent, or Firm* — Meagher Emanuel Laks Goldberg & Liao, LLP

(57) ABSTRACT

A plant holder for holding an amount of rooting (growing) media in which plant roots develop that electrically isolates the plant roots from an electric field used to deliver water and plant nutrients to that rooting media via a high-voltage, low-current electrospray system. A conductive material disposed proximate the rooting media receives electrically charged droplets including water or nutrients and passes the water or nutrients to the rooting media while directing the electrical charge to ground.

20 Claims, 4 Drawing Sheets

(56) References Cited

U.S. PATENT DOCUMENTS

| | | | | |
|---|---|---|---|---|
| 2010/0002983 | A1* | 1/2010 | Kopp | G01M 3/047 |
| | | | | 385/12 |
| 2013/0192129 | A1* | 8/2013 | Schmidt | A01G 7/04 |
| | | | | 47/1.3 |
| 2013/0245359 | A1* | 9/2013 | Brault | A61N 2/02 |
| | | | | 47/1.3 |
| 2013/0305606 | A1* | 11/2013 | Lonsdale | A01G 27/008 |
| | | | | 29/592.1 |
| 2015/0070812 | A1* | 3/2015 | Lee | H01T 23/00 |
| | | | | 361/231 |
| 2016/0235024 | A1* | 8/2016 | Xu | A01G 31/02 |
| 2017/0202156 | A1* | 7/2017 | Harms | A01G 24/00 |
| 2017/0202158 | A1* | 7/2017 | Kochman | A01G 9/24 |
| 2018/0054986 | A1* | 3/2018 | Fu | A01G 31/04 |
| 2018/0055036 | A1* | 3/2018 | Diprose | A01H 3/04 |
| 2019/0037792 | A1* | 2/2019 | Leo | A61K 36/185 |
| 2019/0127240 | A1* | 5/2019 | Engle | A01G 7/04 |
| 2020/0329653 | A1* | 10/2020 | Hall | A01G 31/02 |
| 2022/0053707 | A1* | 2/2022 | de Wet | F21V 9/40 |
| 2022/0087116 | A1* | 3/2022 | Hunter | A01G 27/006 |
| 2022/0408672 | A1* | 12/2022 | Smith | A01G 9/02 |
| 2023/0240207 | A1* | 8/2023 | Fluhrer | B05B 5/0535 |
| | | | | 239/14.1 |
| 2024/0352398 | A1* | 10/2024 | Sword | A01G 18/20 |

FOREIGN PATENT DOCUMENTS

| | | | | | |
|---|---|---|---|---|---|
| CN | 105594473 | A | * | 5/2016 | |
| FR | 2586892 | A1 | * | 3/1987 | |
| GB | 2426908 | A | * | 12/2006 | A01G 25/167 |
| KR | 20150095000 | A | * | 8/2015 | |
| SE | 437210 | B | * | 2/1985 | |

OTHER PUBLICATIONS

Merged translation of FR_2586892 (Year: 1987).*
Merged translation of AT_410158 (Year: 2003).*
Merged translation of CN_104969786 (Year: 2015).*
Merged translation of KR_20150095000 (Year: 2015).*
Merged translation of CN_105594473 (Year: 2016).*

* cited by examiner

PLANT-SAFE ELECTROSPRAY WATER AND NUTRIENT DELIVERY SYSTEM

CROSS-REFERENCE TO RELATED APPLICATION

This application claims priority to U.S. Provisional Patent Application No. 63/399,822, filed on Aug. 22, 2022, entitled PLANT-SAFE ELECTROSPRAY WATER AND NUTRIENT DELIVERY SYSTEM, which application is incorporated herein by reference in its entirety.

GOVERNMENT INTEREST

This invention was made with government support under NASA Grant #AWD00006982. The government has certain rights in the invention.

FIELD OF THE DISCLOSURE

The present disclosure generally relates to hydroponic and aeroponic plant production and, in particular, to mechanisms for utilizing an electrospray irrigation system to efficiently deliver water and plant nutrients to a rooting media in a plant-safe manner.

BACKGROUND

Long-duration space missions are only feasible when a substantial portion of the dietary intake of the crew can be produced during the mission. While plants grown during the mission can be used to largely meet the crew's dietary requirements, plants have evolved dealing with the range of conditions present on Earth, including gravity. If plant production is going to supply astronauts with the majority of their dietary requirements, we have to develop systems that can grow these plants in a zero or microgravity environment.

Hydroponic and aeroponic plant production systems provide a highly controlled and resource efficient method to cultivate a variety of suitable plant species. However, these technologies do not perform well in zero or microgravity environments.

SUMMARY

Various embodiments provide a system, apparatus, and method for holding an amount of rooting (growing) media in which plant roots develop that isolates the plant roots from an electric field used to efficiently deliver water and plant nutrients to that rooting media. Specifically, the various embodiments advantageously provide a mechanism whereby a high-voltage, low-current electrospray is used to deliver water and plant nutrients to the rooting media without causing damage to the roots. A rooting media holder according to the embodiments contains the rooting media with plant roots therein, and shields the plant roots from the electric field associated with the electrospray.

A plant holder according to an embodiment may comprise a rooting media bearing element configured for supporting a rooting media thereon and having apertures therethrough sized to allow passage therethrough of roots from one or multiple plants supported by the rooting media; and a conductive region, disposed proximate the rooting media and configured to receive electrically charged droplets, and to direct electrical charge to ground while allowing water or nutrients within the received droplets to pass toward the rooting media. The plant holder may further comprise a plurality of capillaries configured to guide growth of respective roots away from the conductive mesh. An inner mesh may be disposed between an outer conductive mesh and the rooting media. The inner mesh may comprise an insulating material having formed therein apertures configured to allow water and nutrients to pass therethrough while preventing roots from passing therethrough. The outer conductive mesh may have formed therein apertures configured to allow water and nutrients to pass therethrough while preventing roots from passing therethrough. A moisture sensor may operably be coupled to the rooting media for detecting therein a desired moisture saturation level and responsively providing a spray cessation control signal configured to terminate droplet generation of a respective electrospray source. A current sensor may operably be coupled to the conductive mesh for detecting a charge dissipation current associated with received droplets, such as to monitor electrospray source stability and the like.

A single-plant-single-spray (SPSS) nutrient delivery system according to an embodiment may comprise a plurality of plant holders; each plant holder comprising a rooting media bearing element configured for supporting a rooting media thereon and having apertures therethrough sized to allow passage therethrough of roots from a plant supported by the rooting media, each plant holder comprising a conductive region, disposed proximate a root structure growth area of the rooting media and configured to receive electrically charged droplets, and to direct electrical charge to ground while allowing water and nutrients within the received droplets to enter the rooting media; an electrospray system including at least one electrospray nozzle proximate each plant holder; and a microfluidic controller, configured to supply a nutrient solution comprising at least water to the electrospray system, and to cause the electrospray system to direct electrically charged nutrient solution droplets toward the plant holders.

A method of delivering nutrients to one or more plants according to an embodiment may comprise disposing a rooting medium having one or more plants growing therefrom within a conductive mesh proximate a root structure growth area of the rooting medium wherein responsive to receiving electrically charged droplets of a nutrient solution comprising at least water, the conductive mesh delivers electrical charge to ground while allowing the nutrient solution to pass therethrough and enter the rooting media.

Additional objects, advantages, and novel features of the invention will be set forth in part in the description which follows and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
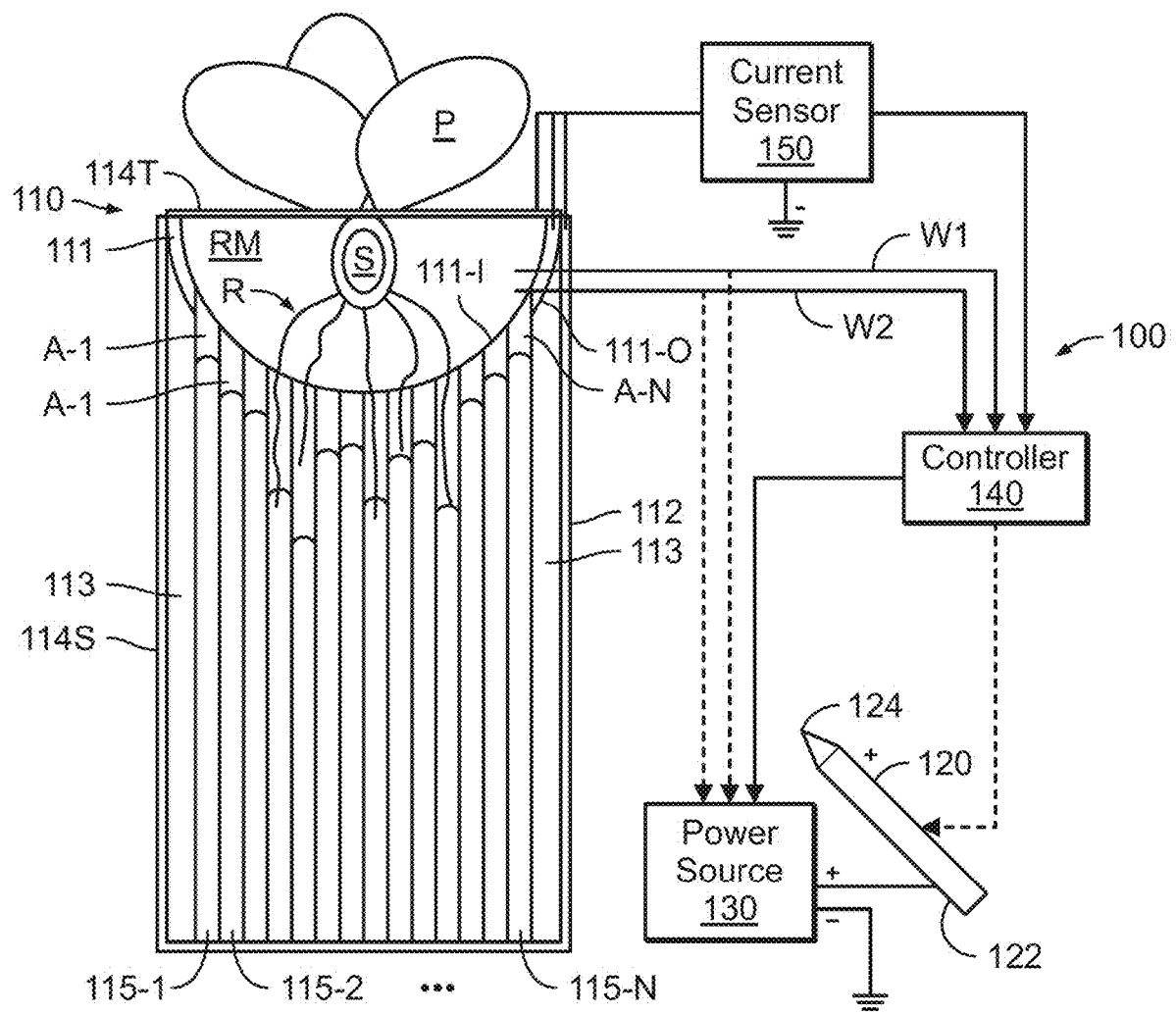
FIG. 1 depicts a functional illustration of a plant-safe electrospray water and nutrient delivery system according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a system, apparatus, and method for holding an amount of rooting (growing) media in which plant roots develop that isolates the plant roots from an electric field used to efficiently deliver water and plant nutrients to the surface of the rooting media. Specifically, the various embodiments advantageously provide a mechanism whereby a high-voltage, low-current electrospray is used to deliver water and plant nutrients to the rooting media without causing damage to the roots.

The various embodiments advantageously provide a mechanism whereby hydroponic or aeroponic plant production can take place in a resource-efficient manner using the electrospray delivery of water and nutrients.

A rooting media holder according to some embodiments contains the rooting media with plant roots therein, and shields the plant roots from the electric field associated with the electrospray.

A plant holder according to the embodiments isolates the roots from the electric fields/currents and prevents new roots from exiting the rooting media RM (i.e., avoid a root pruning effect of the electric fields/currents).

Various embodiments enable single-plant-single-spray (SPSS) electrospray delivery of water and nutrients to plants without damaging the plants within the context of what is denoted by the inventors as a staticaponic system (i.e., a hydroponic or aeroponic system modified in accordance with the embodiments, such as by using the disclosed plant holder). The SPSS delivery technique is extremely efficient since water and nutrients are delivered directly to the rooting media without significant waste. The SPSS technique is well suited for meeting the need for a healthy and highly efficient plant production system in comparison to commercial hydroponics if we define the production efficiency as the amount of plant biomass produced per volume of water consumed such as within the context of automated plant growth environments. In addition, the SPSS techniques are suitable for use in micro/zero-gravity environments such as for long-duration space missions.

It should be noted that term "single-plant" as used herein may refer to a single plant or a single cluster of multiple plants, such as small sprouts or tubers. That is, the term "single plant" comprises a single planting of a particular type of plant, and some types of plants will be associated with a single planting in which multiple plants or plant clusters are typically used for various reasons.

Part of the invention rests upon the observations of the inventors and their determination that, even if the roots are isolated from the electric field, the electric currents associated with the electrostatic deposition of water and nutrients was too high for the plants to grow, causing root damage. The various embodiments address this problem of root damage due to the electric field by separating the rooting media from the delivery site of the water and nutrients.

In various embodiments, separation (or electrical isolation) of the root environment is achieved by covering the rooting media with a grounded conductive mesh that acted as the spray target. This conductive mesh is small enough to induce capillary flow while ensuring that droplets were deposited on the conductive mesh, and that such droplets could flow into the root environment. This way, the nutrient solution (water with dissolved nutrients) is delivered to the root environment without any negative impact from the electric current associated with the electrospray.

A benefit of using electrospray to water plants and provide nutrients is that there is no overspray (droplets that do not reach the plant) or fouling of the irrigation system. This is of special importance in places where resources are limited, and where fouling is a large concern. Specifically, we designed this new method for the International Space Station and other space missions, including eventual travel to Mars. In space, energy and computation is cheap, while mass is expensive, and cleaning is challenging. Various embodiments provide a one-plant-one-sprayer approach to irrigate plants using electrospray deposition. Such a system could be scaled up for very large and very efficient plant production systems.

FIG. 1 depicts a functional illustration of a plant production system that uses electrospray deposition to deliver water and nutrients. Specifically, the plant production system 100 of FIG. 1 as depicted includes a plant holder 110 configured to hold a rooting media RM supporting a root system R of a plant P. The plant P has grown from a seed S disposed within an initial growth media, such as a rockwool plug or similar.

The plant P receives water and dissolved nutrients via an electrospray irrigation system or electrospray source 120. A power source 130 provides a relatively high voltage potential (e.g., 5-10 kV, or such other voltage potential sufficient to operate the electrospray source 120) across positive (+) and negative (−) output terminals, wherein the positive (+) output terminal electrically cooperates with at least a working fluid 122 (e.g., water and/or dissolved nutrients and/or pesticides, etc.) within the electrospray source 120 and the negative (−) output terminal is grounded. The plant P is also grounded, such as via a grounding of the rooting media RM or other direct or indirect grounding means or connection.

The various embodiments utilize electrospray delivery of water, nutrients and the like, in which a relatively high electric potential difference between the working fluid 122 and the plant P is used to create an electric field operative to promote the motion of positively charged working fluid droplets emitted via an output electrode 124 of the electrospray source 120 toward the plant P. Specifically, the output electrode 124 may be shaped as a hollow needle or capillary that is used as a nozzle to emit liquids. Due to the shape of the liquid meniscus, competing surface tension, and electrostatic forces, different spray modes can be generated, and these modes depend on the flow rate, applied voltage, and the properties of the liquid. A useful spray mode is a cone-jet mode, which occurs when there is a stable balance between the forces.

In the cone-jet mode, liquid forms a "Taylor cone," and a tiny jet emits from the end of the cone. This liquid jet breaks up into small, charged droplets with a size determined by the properties of the fluid. These droplets are drawn directly to a grounded target, for example a plant. The charged droplets provided by the electrospray output electrode may be directed to the roots of a plant via the electromagnetic field between the (charged) electrospray output electrode and the (grounded) plant. However, gravitational forces can complicate cone-jet stability. So, the cone-jet mode will be more stable in low/zero gravity environments, which makes this spraying method uniquely suitable to microgravity environments. It is noted that other spray modes are also of use in microgravity environments, such as micro dripping, spindle, multi-spindle and multi jet modes, and that these modes (and corresponding output electrodes 124) are contemplated by the inventors as suitable for use in the various embodiments disclosed herein.

The plant holder 110 comprises a growth media bearing element 111 having an inner wall or surface 111-I and an outer wall or surface 111-O. The growth media bearing element 111 is disposed above and mechanically supported by an insulating base or, if capillaries formed therein, an insulating capillary base 112 comprising an inner portion 113, a conductive mesh portion 114, and a plurality of capillaries or tubes 115-1 through 115-N (collectively capillaries 115), which capillaries extend downward from corresponding apertures A-1 through A-N formed in the growth media bearing element 111.

The conductive (e.g., metal) mesh 114 may comprise of a mesh structure 114T disposed across some or all of the top of the rooting media RM. For example, the conductive mesh 114 may be disposed across the entirety of the rooting media RM (i.e., from wall to wall of the base 112), or across only a portion of the rooting media RM (e.g., a portion proximate to the point in the rooting media RM from which the plant P has emerged). The size of the conductive mesh 114 with respect to the rooting media RM may be selected in response to the root growth pattern of the plant P of interest.

The conductive mesh 114 may be disposed upon, or integrated within, the growth media bearing element 111 (e.g., part of the inner (upper) surface 111-I, part of the lower (outer) surface 111-O, and/or therebetween). In these embodiments, the conductive mesh 114 is configured to pass to the roots R the received electrospray delivered water, nutrients and the like while preventing the passing thereto of electric fields/currents considered to be detrimental to the roots R.

The conductive mesh 114 may comprise a mesh structure 114S disposed upon, or integrated within, some or all of the side walls of the insulating capillary base 112, such as will be described in more detail below with respect to FIG. 3. Briefly, and as shown in FIG. 3, a plant holder 110 may be formed with side walls having disposed thereon, or formed using an outer conductive mesh CM and, optionally, an inner insulating mesh IM. The grounded outer conductive mesh CM attracts droplets from the electrospray irrigation system or electrospray source 120 while shielding root structures from the electric field and electric current of the electrospray irrigation system 120. The outer conductive mesh CM is sized to pass received droplet through to the rooting media RM directly or via the optional inner insulating mesh IM.

In some embodiments, the conductive mesh 114 comprises one or more conductive layers of metal or other conductive material.

In some embodiments, the conductive mesh 114 comprises one or more outer conductive mesh layers and one or more inner insulating layers (e.g., formed from polymers, mylar, steel wool or similar, and/or other suitable materials) so as to provide electrical isolation between the upper portions of the plant P and the roots R.

In operation, the conductive mesh 114 is grounded as a spraying target can decrease the effect of electric current carried by sprayed droplets. The conductive mesh 114 has holes with appropriate diameter with respect to the roots R and droplet size (typically having diameters from approximately 0.1 microns to approximately 100 microns), while the average diameter of roots are around 0.5 millimeter and the tip can be less than 0.1 mm. To avoid roots extending through the conductive mesh 114, a nylon mesh with smaller openings (e.g., 50 microns) may be disposed between the conductive mesh (or integrated into the conductive mesh 114) and the rockwool plug RP. In this manner, roots are protected from the negative effects of the electric field and the electric current.

The capillaries 115 are configured to guide growing roots downward toward a bottom portion of the insulating capillary 112 so as to avoid subjecting the roots to electromagnetic energy associated with the electrospray irrigation system 120. Specifically, the capillaries 115 have a geometry configured to guide the roots R of the plant P into an insulated zone such that electrical currents associated with the electrostatic spray deposition of water, nutrients, pesticides, fungicides, and the like on the rooting media RM will not harm the roots R.

In one embodiment, an insulating capillary base 112 is used to guide the roots away from the conductive mesh. The insulating capillary base 112 may be formed by additive manufacturing of hydrophilic nylon and consist of a hexagonal cells with characteristic dimensions illustratively ranging from 0.5 mm to 3 mm, depending upon the size of the roots R of the plants P to be grown. These tubes will fill only after the media has become saturated and will fill at a rate that can be approximated by the Washburn-Lucas equation:

$$v \approx \left(\frac{\sigma \cos \gamma}{16\eta}\right)^{\frac{1}{2}} \left(\frac{r}{t}\right)^{\frac{1}{2}} \quad (1)$$

where σ, γ, and η and are the surface tension, and contact angle with the pore walls of the nutrient solution, r is the characteristic pore radius, and t is time.

As roots infiltrate the pores of the support, the effective pore radius will decrease as the roots fill space within the pores. As such, the rate at which pores containing roots will fill will be more rapid than the other pores and, further, this enhanced rate will begin to diminish once the roots have been fully enveloped in nutrient solution. This will ensure that each root is fully coated during the irrigation process, but also provide for ample aeration time. The amount of time that each root will be coated will be determined by the relative size of the channel and whatever means is used to determine saturation (e.g., timer or moisture sensor). In various embodiments, the use of a thin-walled nylon support will allow for the pores to expand and pore structures to deform to some extent to accommodate expanding root sizes. Further, the solid nature of the material will allow for removal and reuse of the capillary supports.

In various embodiments, the holder 111 for the rooting media RM isolates the plants from the current and electric field of the electrospray while allowing for water and nutrient transport. In one embodiment, rooting media RM is placed in a conductive mesh (which blocks electric currents and fields) which is separated from the rooting media RM by a liner comprising an insulating mesh such as a nylon mesh (prevents root penetration of the conductive mesh).

In various embodiments, the rooting media RM itself is modified to provide the conductive and/or isolating properties of the conductive mesh 114. That is, the rooting media RM itself is formed of materials that integrate the current/field blocking function of the mesh 114 into one disposable rooting media RM component.

Figure 2:
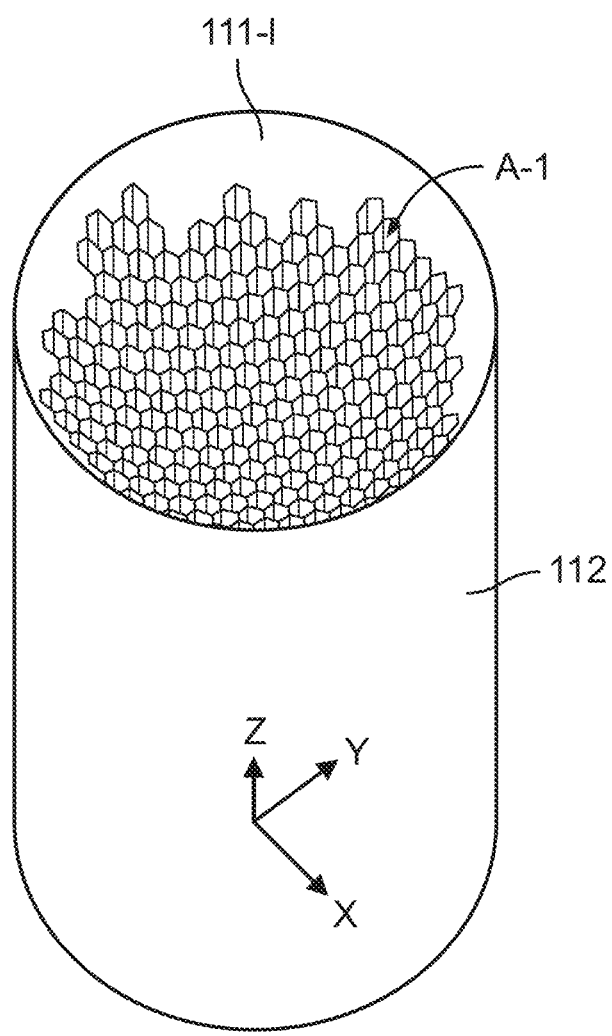
FIG. 2 depicts a perspective view of an exemplary plant holder suitable for use in the plant-safe electrospray water and nutrient delivery system of FIG. 1.

FIG. 2 depicts a perspective view of an exemplary plant holder suitable for use in the plant production system of FIG. 1. Referring to FIG. 2, a substantially cylindrical plant holder 110 is depicted from a perspective view in which the outer portion of the insulating capillary base 112, the outer wall or surface 111-O of the growth media bearing element 111, and the apertures A through the growth media bearing element 111 are visible.

The inventors note that roots may tend to grow gravitropically, such that the roots might grow through the conductive mesh and thereby be exposed to damaging electric fields/currents. Therefore, various embodiments employ the capillaries discussed above with respect to FIGS. 1-2, which capillaries operate to guide the direction of root growth such that root growth excursions to or through the conductive mesh is avoided.

It is noted that while the plant holder 110 of FIGS. 1-2 is depicted as having a substantially cylindrical shape, any other shape may be used consistent with the functions/purpose of the plant holder 110 as described herein. Moreover, though depicted as descending through the insulating capillary base 112 in a substantially straight manner, the capillaries 115 may descend in any manner consistent with the functions/purpose of the capillaries 115 as described herein.

Thus, as described above, a method of delivering nutrients to one or more plants may be provided by disposing a rooting medium having one or more plants growing therefrom within a conductive mesh proximate a root structure growth area of the rooting medium, wherein responsive to receiving electrically charged droplets of a nutrient solution comprising at least water, the conductive mesh delivers electrical charge to ground while allowing the nutrient solution to pass therethrough and enter the rooting media. The electrically charged droplets may be produced by an electrospray system. The conductive mesh may be held at a different electrical potential from the electrospray system. Other embodiments are also contemplated to the method as described above with respect to FIGS. 1-2.

Various experiments were carried out by the inventors using Bibb lettuce as a target plant. This kind of lettuce is fast-growing, and it typically needs between 40-50 days to reach maturity. A nutrient solution sprayed onto the rooting media is a mixture of 1-gallon filtered tap water, 1.5 teaspoons of MaxiGro nutrients, and 1-2 g of Calcium Hydroxide to increase the pH. The ideal pH for hydroponic lettuce is between 5.6-5.8; so, a pH of 5.7 was used. To provide enough nutrients for the plant, an electrical conductivity (EC) of 2.1 mS/cm was maintained. The temperature and humidity were controlled and monitored in the laboratory environment using a Renogy Mini Humidifier and room air conditioning. Higher humidity levels may be employed to assist with electrospray stability. Also, a Valoya R150 LED fixture was used as the light source and the plants were exposed to a 16-hour photoperiod. Optimal and experimental conditions are shown in Table 1, as follows:

TABLE 1

| | Optimal Conditions | Experimental Conditions |
|---|---|---|
| pH | 5.6-5.8 | 5.7 |
| EC (mS/cm) | 1.2 | 2.1 |
| Temperature (° F.) | 65-75 | 77-80 |
| Relative humidity (%) | 50-70 | 70-80 |
| Photoperiod (h) | 12-20 | 16 |
| PAR intensity ($\mu mol \cdot m^{-2} \cdot s^{-1}$) | 400-600 | 200-600 |

Some tests used a light fixture installed above the spray test chamber and the control trays by using a T-Slot frame. This configuration of the control and sprayed plants being grown underneath the same light source was due to sourcing difficulties which prevented us from obtaining another high-powered LED light source. A NE-1600 Six Channel Programmable Syringe Pump was used to deliver the nutrient solution, and the electric potential difference between the two electrodes was applied by an Acopian High Voltage Power Supply (P025HA2.4). A LabView code controlled both syringe pump and high voltage power supply. A stainless-steel ring, with an inner diameter of 3.5 cm and an outer diameter of 5.5 cm, was used as the counter electrode and it was connected to the ground wire. A rockwool plug containing the sprouted seedling was placed in the center of the ring. A hollow stainless-steel needle located near the bottom of the plug was used as the high voltage electrode and nutrient source. The needle was positioned away from the plug and angled −45° to prevent contact with water droplets falling from the rockwool plug. It should be noted that this would not be necessary in a microgravity environment, allowing for an even more compact system.

Figure 4:
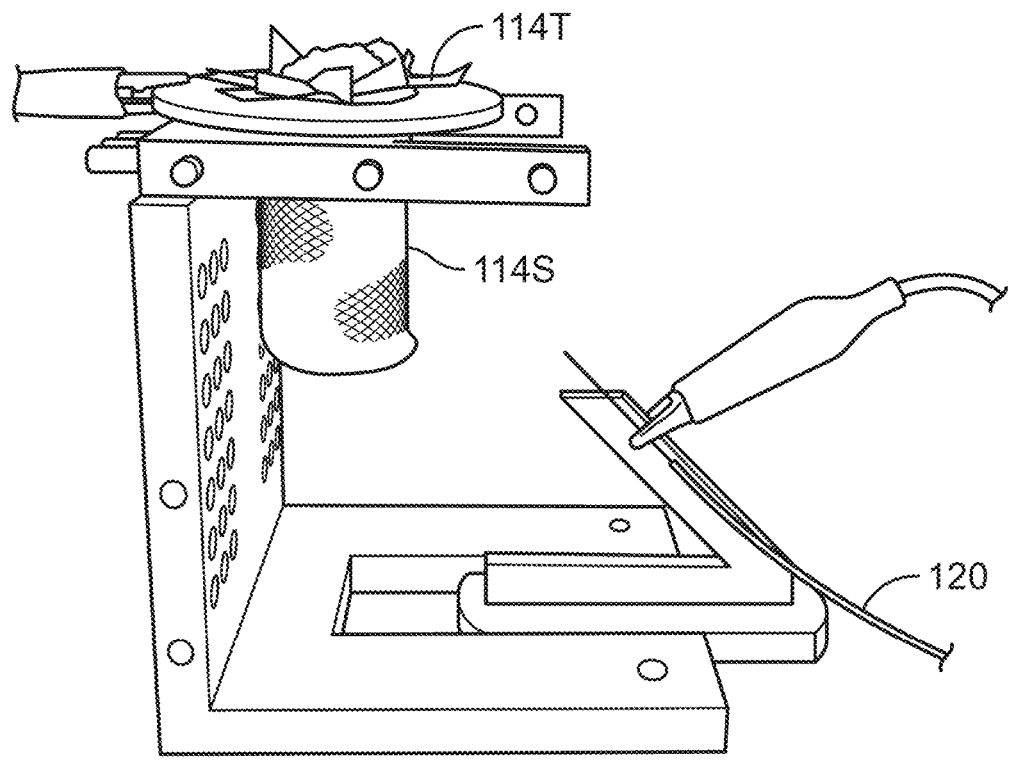
FIG. 4 depicts an image of an experimental plant-safe electrospray water and nutrient delivery system as described above with respect to FIG. 1.

FIG. 4 depicts an image of an experimental plant-safe electrospray water and nutrient delivery system as described above with respect to FIG. 1. Specifically, the system shown in FIG. includes a stainless-steel ring with an inner diameter of 3.5 cm and an outer diameter of 5.5 cm, the ring being used as a counter electrode and connected to a ground wire. Seedlings were germinated in rockwool plugs and bottom irrigated. A rockwool plug containing a germinated seedling was then placed in the center of the grounding ring and as described below, covered in some experiments with either nylon mesh with openings of 50 μm and/or steel wire mesh with openings of 0.63 mm. A 20-gauge hollow stainless-steel needle located on the bottom of the plug was used as the high voltage electrode and nutrient solution delivery device. The needle was positioned away from the plug and angled −45° to prevent contact with any droplets falling from the rockwool plug.

Spray stability of the plant nutrient solution was investigated. Previous work showed that it could be difficult to spray water solutions due to the high surface tension, and mitigation plans were considered should the electrospray process not work properly with plant nutrient solutions. The surface tension and electrical conductivity maintained for the nutrient solution allows for a stable cone-jet spray at high flow rates (>3 ml/h) without the use of an extender cap, and that allows for even higher flow rates (>10 ml/h) with the use of an optional extender cap (which is more useful in low gravity applications, since it may produce unwanted water accumulation due to gravity effects).

In various embodiments, a manual spraying protocol comprises spraying droplets toward the rockwool plug until dripping was observed in the chamber while monitoring the stability of the spray via camera.

In various embodiments, an automated spraying protocol (e.g., such as for an automated nutrient delivery system such as discussed below with respect to FIG. 3) comprises determining an appropriate level of water (or other liquid) saturation, monitoring the saturation level of the plug such as via an open/closed circuit meter (i.e., a pair of conductors being electrically connected or shorted together when water or nutrient solution in the plug is saturated to a point of being surrounded by excess water). This can be an indicator of when watering can be stopped. Other sensors may be used for moisture sensing.

Referring to FIG. 1, an optional moisture sensor may be provided via a pair of wires W1 and W2, wherein first ends of the wires is inserted into the rooting media RM and not in direct contact with each other, and second ends of the two wires is coupled to a controller 140. Broadly speaking, the moisture sensor is operably coupled to the rooting media for detecting therein a desired moisture saturation level and responsively providing a spray cessation control signal configured to terminate droplet generation of a respective electrospray source.

Moisture levels indicative of saturation of the rooting media RM will provide a conductive path between the ends of the two wires inserted into the rooting media RM, thereby completing a circuit which may be detected by the controller 140 or directly by an electrospray source 120.

The controller 140 may responsively cease watering a plant in response to an indication of moisture saturation at the plant's rooting media RM. Different locations for wire termination/insertion may be uses. Different types of moisture sensing may also be used.

In various embodiments, the electrospray irrigation system or electrospray source 120 (or respective power source 130) is directly controlled via the optional moisture sensor W1/W2 (i.e., no need for a controller 140).

These and other moisture sensing techniques may also be used in the various embodiments discussed below with respect to FIG. 3.

In various embodiments, electrospray stability is monitored by sensing and recording a current passing through a ground wire associated with a plant holder/root medium. This may be accomplished via a simple current sensor/operational amplifier circuit configured to amplify the very small current associated with directing charge from the sprayed droplets to ground so as to provide thereby a voltage level indicative of the grounded charge associated with the received droplets at a plant holder. A stable charge dissipation current indicates a stable spray, while an unstable charge dissipation current (e.g., spikes and high levels of noise) indicate unwanted spray system effects such as dripping, clogging, and the like. A feedback loop with this signal is used in various embodiments to stabilize the spray by modifying the voltage imparted to the sprayer such that a stable spray state is promoted.

Referring to FIG. 1, an optional current sensor 150 is configured to measure current associated with droplet charge being dissipated to ground, and provide an output signal to the controller 140 indicative of an amount of charge being dissipated. The output signal is configured to enable the controller to monitor electrospray source stability and/or performance, to help troubleshoot electrical issues, and so on.

These and other current sensing techniques may also be used in the various embodiments discussed below with respect to FIG. 3. Further, the optional current sensor 150 may also be used with individual plant holders 110, or groups of plant holders 110, such as discussed below with respect to FIG. 3.

In some embodiments, a larger rockwool plug is used to provide a larger rooting volume, which operates to mitigate the transfer of electric fields/currents to the roots R.

In various embodiments, a nylon mesh is used to cover the root plug RP to prevent the roots from exiting the plug during growth.

Various embodiments comprise a plant production system, including computer-controlled voltage regulation and fluidic delivery system providing individual fluidic delivery to each of many plants, each of the plants being supported in its own modular plant holder 110 such as described above.

Figure 3:
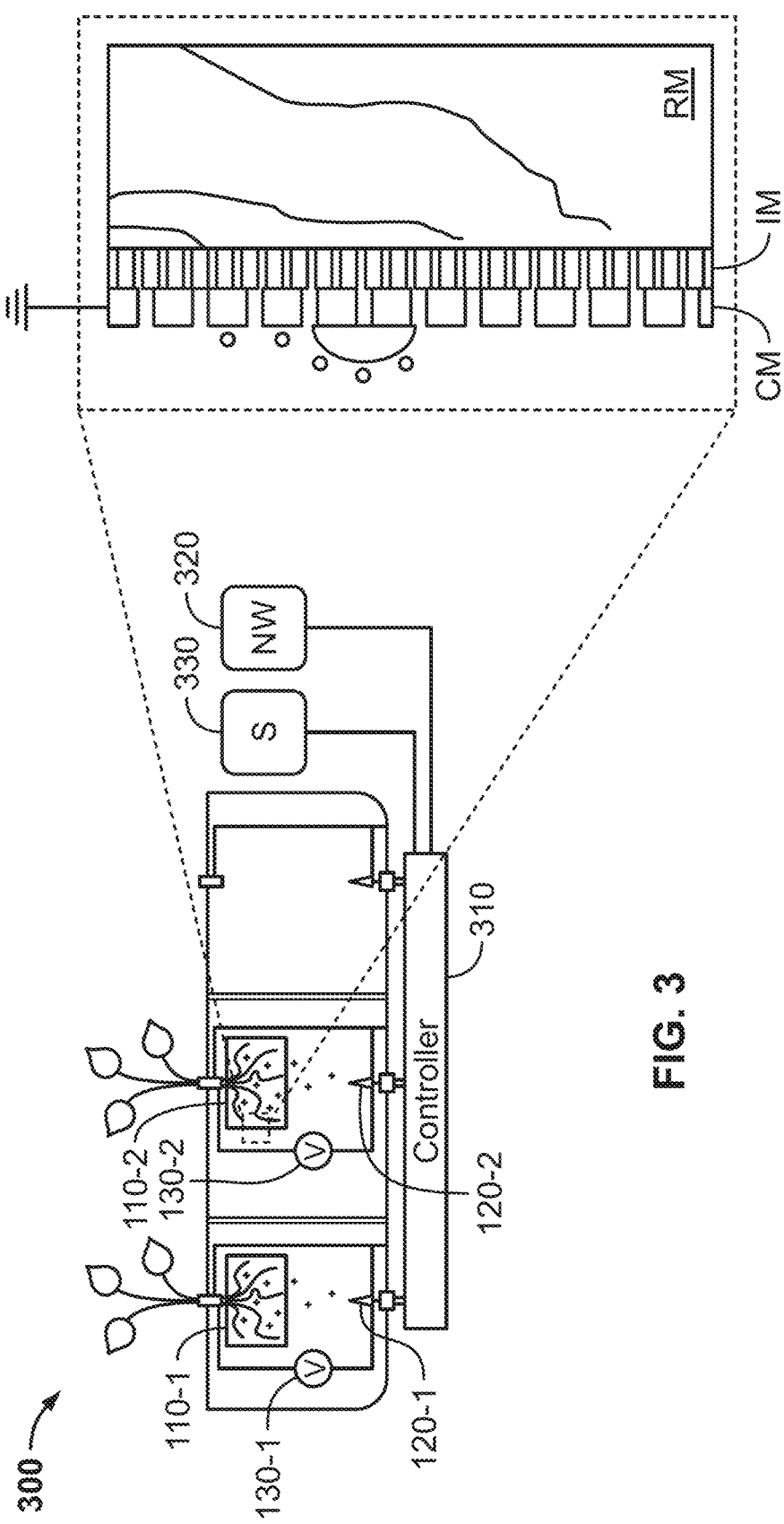
FIG. 3 depicts a functional illustration of a computer-controlled electrospray water and nutrient delivery system for multiple plants according to an embodiment.

FIG. 3 depicts a functional illustration of an automated multiple plant production system according to an embodiment. Specifically, the system 300 of FIG. 3 comprises several single-plant-single-spray (SPSS) modules configured into an automated multiple plant production system including a plurality of plant holders 110 (illustratively two plant holders 110-1 and 110-2), each plant holder 110 containing a respective rooting media RM for growing a respective plant. Each plant is provided with water and dissolved nutrients (NW) and any supplements (S) via a respective electrospray nozzle 122 configured to generate positively charged water and/or supplement droplets in accordance with a voltage source 130, the positively charged droplets being attracted to the grounded rooting media RM.

Referring to FIG. 3, it is noted that the conductive mesh 114 may comprise a mesh structure 114S disposed upon, or integrated within, some or all of the side walls of an individual plant holder 110. That is, a plant holder 110 may be formed with side walls having disposed thereon, or formed using, an outer conductive mesh CM and, optionally, an inner insulating mesh IM. The grounded outer conductive mesh CM attracts droplets from the electrospray irrigation system or electrospray source 120 while shielding root structures from the electric field and electric current associated with the electrospray irrigation system or electrospray source 120. The outer conductive mesh CM is sized to pass received droplets through to the rooting media RM directly or via the optional inner insulating mesh IM.

A microfluidic controller 310 is coupled to a nutrient water (NW) reservoir 320 and a supplement (S) reservoir 330, and is configured to deliver, at appropriate times, the appropriate amounts of nutrient water and any supplements to the plants via their respective electrospray nozzles 122. That is, the microfluidic controller is configured to receive water and supplements from respective storage tanks (or similar), to determine a ratio of water and supplements (for individual plants, for all the plants, or for groups of plants), and to provide nutrient solutions in accordance with the determined ratio(s).

Generally speaking, the microfluidic controller 310 is operably coupled to the voltage source(s) 130, electrospray source 120 including an electrospray nozzle 122, and various supporting circuitry (not shown) in a manner causing the delivery to each plant (at appropriate times) an appropriate amount of water, nutrients, supplements, and the like.

It is noted that while individual voltage sources 130 associated with respective plant holders 110 are depicted in FIG. 3, there is no need to use such individual sources. For example, a single voltage source 130 may be used for a multi-plant production system (e.g., comprising thousands of plant holders 110), a rack within such a system (e.g., comprising a portion of the total number of plant holders 110), or multiple such racks. Generally speaking, the voltage source 130 is configured in whatever manner is suitable for directing droplets from an electrospray nozzle 122 to the corresponding plant holder(s) 110.

The single-plant-single-spray (SPSS) computer-controlled multiple plant production system 300 of FIG. 3 may comprise thousands of plants, each plant in an individual plant holder 110. The plant holders 110 may be arranged in any suitable manner, such as in trays and/or racks, vertically and/or horizontally stacked within an available volume devoted to plant production (e.g., such as within a space station). In various embodiments, the controller 310 is configured to control which portions (e.g., racks, rows, etc.) of the multi-plant production system 300 are active at the same time so as to avoid electrical interference therebetween (e.g., avoid one plant receiving droplets intended for another plant).

As discussed herein, while plants do need water and such water may be delivered via electrospray (with or without additional nutrients), it is noted that the water need not come from the electrospray. That is, the water may be delivered via other means, such as increased via humidity or engineered water nanostructures (ionic species of water such as hydronium and hydroxide), along with pesticides (acids) by electrospray. In some embodiments, ionized nutrients and pesticides may be delivered via electrospray and water may be delivered via some other means (e.g., foliar delivery). Thus, the term "droplets" as described above with respect to the electro spray may in some embodiments comprise "particulates" wherein these particulates comprise nutrients in an electrospray that does not include water, or only includes sufficient water to enable the use of electrospray.

Further, various embodiments are directed to electrospray that targets the portion of the plant above the roots, the portion of the plant within a rooting media, or both. The metal mesh may comprise any conductive material suitable for use in performing the functions as defined herein, such as nonwoven wools, a plurality of wires forming a non-mesh cage, and so on.

Thus, the various embodiments provide apparatus and methods for delivering nutrients to one or more plants, comprising: disposing a rooting medium having one or more plants growing therefrom within a conductive region of the plant holder proximate to the plant(s) wherein responsive to receiving electrically charged particulates, the conductive region extracts electrical charge while allowing the particulates to pass and arrive at the plants or medium. The particulates may comprise electrically charged nutrient solution droplets comprising at least water and produced by an electrospray system. The conductive region may comprise a metal mesh, steel wool, or some other electrically active mechanism suitable for the described purpose, substantially surrounding or enclosing the rooting medium, and held at a different electrical potential the electrospray system.

The microfluidic controller 310 and other elements described herein may be implemented at least in part as computers of various types, though generally a processor element (e.g., a central processing unit (CPU) or other suitable processor(s)), a memory (e.g., random access memory (RAM), read only memory (ROM), and the like), various communications interfaces and the like. As such, the various functions depicted and described herein such as with respect to the operation of the microfluidic controller 310 or other elements may be implemented as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein.

Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory or stored within a memory within a computing device operating according to the instructions.

Figure 5:
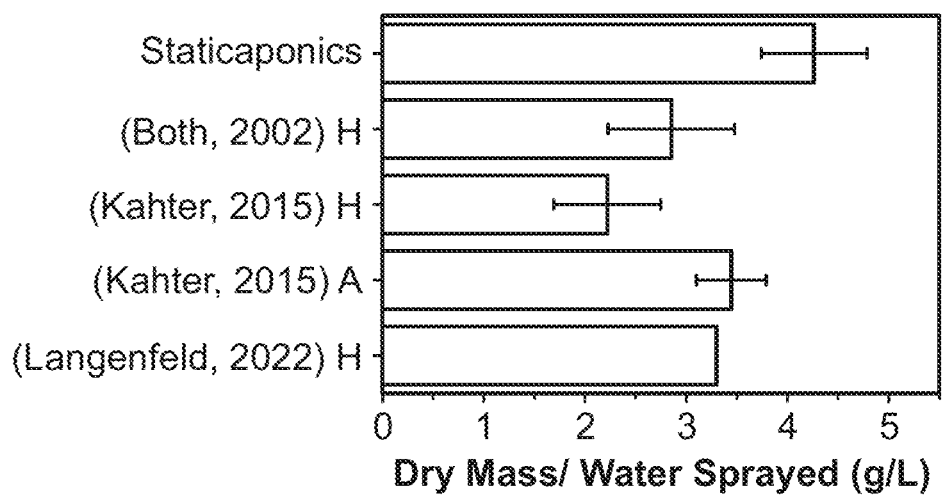
FIG. 5 graphically depicts performance metrics associated with the various embodiments.

FIG. 5 graphically depicts performance metrics associated with the various embodiments. Specifically, one of the unique advantages of the staticaponic approach described herein is that by knowing the flow rate and spray duration, the exact amount of delivered nutrient solution can be determined. Also, the plant day mass can be measured after harvesting. To compare the nutrient solution use efficiency obtained with the staticaponic growing method to other reported use efficiencies we focused on our adult plants from the 4-week trials, which we compared to literature values for hydroponic lettuce (Both, 2002; Khater, 2015) (including a recent value of 3.3 g/L for hydroponic lettuce growth by Lindenfeld et al. reported without data (Langenfeld et al., 2022)) and aeroponic lettuce (Khater, 2015). All our trials outperformed the efficiency values reported in the literature for either hydroponic or aeroponics production systems, demonstrating for the first time that a lettuce plant can be efficiently provided of water and nutrients solely through an electrostatic spray system. It should further be noted that the water use efficiency reported in the literature was measured from plant transpiration (Both, 2002; Langenfeld et al., 2022) or modeled (Khater, 2015), and therefore does not include water left in a hydroponic reservoir or oversprayed water in an aeroponic system, making those values upper bounds in terms of use efficiency. In contrast, the plants grown using the staticaponic method used exactly the amount of water and nutrients tabulated. Based on these results, staticaponic was validated as a novel growing technique that uses less water compared to commercial hydroponic or aeroponic production systems.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A plant holder, comprising:
   a rooting media bearing element configured for supporting rooting media thereon and having apertures therethrough sized to allow passage therethrough of plant roots extending from a root structure growth area of the rooting media; and
   a conductive cage for receiving electrically charged droplets, and directing electrical charge to ground outside of the root structure growth area of the rooting media while allowing water or nutrients within the received droplets to pass toward plant roots.

2. The plant holder of claim 1, wherein the rooting media bearing element delineates the root structure growth area.

3. The plant holder of claim 1, further comprising a plurality of electrically insulating capillaries configured to guide root growth away from the conductive cage.

4. The plant holder of claim 1, further comprising an electrically insulating inner mesh configured to guide root growth away from the conductive cage.

5. The plant holder of claim 4, wherein the electrically insulating inner mesh having formed therein apertures configured to allow water and nutrients to pass therethrough while preventing roots from passing therethrough.

6. The plant holder of claim 5, wherein the conductive cage comprises an outer mesh disposed across at least a portion of the rooting media.

7. The plant holder of claim 1, further comprising a moisture sensor for detecting a desired rooting media moisture saturation level and responsively providing a spray cessation control signal configured to terminate droplet generation of a respective electrospray source.

8. The plant holder of claim 1, further comprising a current sensor for detecting a conductive cage charge dissipation current associated with received droplets.

9. The plant holder of claim 8, wherein the current sensor provides an output signal configured to enable a controller to monitor electrospray source stability.

10. A single-plant-single-spray (SPSS) water and nutrient delivery system, comprising:

a plurality of plant holders, each plant holder comprising:

a rooting media bearing element configured for supporting rooting media thereon and having apertures therethrough sized to allow passage therethrough of plant roots extending from a root structure growth area of the rooting media, and a conductive cage for receiving electrically charged droplets, and directing electrical charge to ground outside of the root structure growth area of the rooting media while allowing water or nutrients within the received droplets to pass toward plant roots;

an electrospray system including at least one electrospray nozzle proximate each plant holder; and a microfluidic controller, configured to supply a nutrient solution comprising at least water to the electrospray system, and to cause the electrospray system to direct electrically charged nutrient solution droplets toward the plant holders.

11. The SPSS water and nutrient delivery system of claim 10, wherein the microfluidic controller is further configured to receive water and supplements from respective storage tanks and provide nutrient solutions in accordance with a determined ratio of water and supplements.

12. The SPSS water and nutrient delivery system of claim 10, wherein each plant holder further comprises a plurality of electrically insulating capillaries configured to guide root growth away from the conductive cage.

13. The SPSS water and nutrient delivery system of claim 10, wherein each plant holder further comprises an electrically insulating inner mesh configured to guide root growth away from the conductive cage.

14. The SPSS water and nutrient delivery system of claim 13, wherein the electrically insulating inner mesh having formed therein apertures configured to allow water and nutrients to pass therethrough while preventing roots from passing therethrough.

15. The SPSS water and nutrient delivery system of claim 10, wherein each conductive cage comprises an outer mesh disposed across at least a portion of respective rooting media.

16. The SPSS water and nutrient delivery system of claim 10, wherein each plant holder further comprises a moisture sensor for detecting a desired rooting media moisture saturation level and responsively providing a spray cessation control signal configured to terminate droplet generation of a respective electrospray source.

17. The SPSS water and nutrient delivery system of claim 10, wherein each plant holder further comprises a current sensor for detecting a conductive cage charge dissipation current associated with received droplets to enable a controller to monitor electrospray source stability.

18. A method of delivering nutrients to one or more plants, comprising:

providing a plurality of plant holders, each plant holder comprising:

a rooting media bearing element configured for supporting rooting media thereon and having apertures therethrough sized to allow passage therethrough of plant roots extending from a root structure growth area of the rooting media, a conductive cage for receiving electrically charged droplets, and directing electrical charge to ground outside of the root structure growth area of the rooting media and away from plant roots while allowing water or nutrients within the received droplets to pass toward plant roots; and one or more plants;

controlling a microfluidic controller to spray a nutrient solution via an electrospray system including at least one electrospray nozzle toward the plant holders; and directing electrical charge to ground outside of the root structure growth area of the rooting media and away from plant roots while allowing water or nutrients within the received droplets to pass toward plant roots.

19. The method of claim 18, wherein each plant holder further comprises a moisture sensor for detecting a rooting media moisture saturation level, the method further comprising terminating droplet generation of a respective electrospray source in response to detection of a desired rooting media moisture saturation level.

20. The method of claim 18, wherein each plant holder further comprises a current sensor for detecting a conductive cage charge dissipation current associated with received droplets, the method further comprising monitoring electrospray source stability by detecting conductive cage charge dissipation currents associated with received droplets.

\* \* \* \* \*